Figure 1:
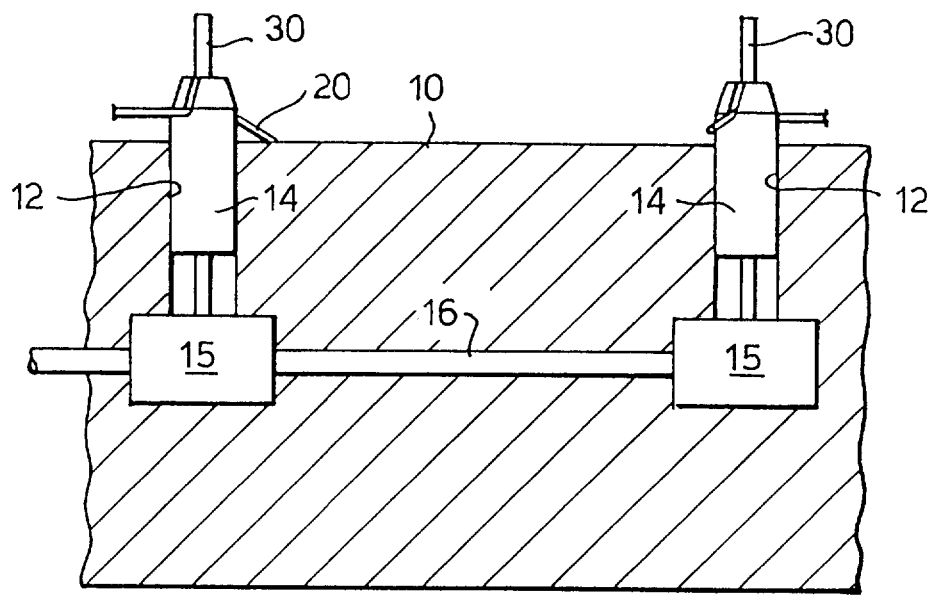

United States Patent [19]
Tessier

[11] Patent Number: 5,862,585
[45] Date of Patent: Jan. 26, 1999

[54] ELECTROFUSION COUPLERS AND METHOD AND APPARATUS FOR MANUFACTURING

[75] Inventor: Gary Raymond Tessier, Hertfordshire, Great Britain

[73] Assignee: Glynwed Pipe Systems Limited, United Kingdom

[21] Appl. No.: 718,316

[22] PCT Filed: Mar. 29, 1995

[86] PCT No.: PCT/GB95/00720

§ 371 Date: Dec. 26, 1996

§ 102(e) Date: Dec. 26, 1996

[87] PCT Pub. No.: WO95/26873

PCT Pub. Date: Oct. 12, 1995

[30] Foreign Application Priority Data

Mar. 31, 1994 [GB] United Kingdom .................... 9406591

[51] Int. Cl.⁶ ............................ H05B 3/00; H01C 17/04; H01C 17/28; H01R 43/00
[52] U.S. Cl. ................................ 29/618; 29/611; 29/619; 29/858; 264/272.18; 264/278; 425/125; 219/541; 219/544
[58] Field of Search .............................. 29/611, 618, 619, 29/858; 264/272.18, 278, 279; 425/125, 129.1; 219/541, 544, 535, 526; 156/380.2

[56] References Cited

U.S. PATENT DOCUMENTS

| | | | |
|---|---|---|---|
| 2,651,768 | 9/1953 | Oortgijsen . | |
| 4,147,926 | 4/1979 | Stähli | 219/535 |
| 4,224,505 | 9/1980 | Sturm | 219/544 |
| 4,727,242 | 2/1988 | Barfield | 219/535 |
| 4,848,718 | 7/1989 | Harrison | 264/278 |
| 4,855,574 | 8/1989 | Lodder et al. | 219/535 |

FOREIGN PATENT DOCUMENTS

| | | |
|---|---|---|
| 0055891 | 7/1982 | European Pat. Off. . |
| 0243062 | 10/1987 | European Pat. Off. ........ B29C 67/18 |
| 0255264 | 2/1988 | European Pat. Off. ........ B29C 47/02 |
| 0260014 | 3/1988 | European Pat. Off. ........ B29C 67/18 |
| 0396273 | 11/1990 | European Pat. Off. ........ B29D 23/00 |
| 1048106 | 5/1956 | Germany . |
| 1151848 | 7/1963 | Germany . |
| 1615582 | 12/1969 | Germany . |
| WO 79/01140 | 12/1979 | WIPO . |
| WO 90/01817 | 2/1990 | WIPO ............................ H01R 43/04 |

OTHER PUBLICATIONS

Patent Abstract of Japan, Publication No.: JP2030508, Publication Date: 31 Jan. 1990; p. 1 of 1.
Patent Abstract of Japan, Publication No.: JP2022021, Publication Date: 24 Jan. 1990; p. 1 of 1.

Primary Examiner—P. W. Echols
Attorney, Agent, or Firm—Fulwider Patton Lee & Utecht, LLP

[57] ABSTRACT

An electrofusion coupler, for connecting plastics pipes end to end, is formed using a mandrel 10 having at spaced apart locations therealong first and second terminal holder 14. Each terminal holder 14 receives a malleable metal terminal pin 30, and has a diametral slot 26 for receiving an electrical resistance wire 20 which is extended across one terminal holder 14, wound in a plurality of turns around the mandrel 10 and is extended across the other terminal holder 14. Malleable terminal pins 30 are driven into the terminal holder, along the axis of the pin, so that the inner end of the pin is crimped onto the wire to grip it firmly. The mandrel 10, is then placed in an injection mould, an electrofusion sleeve injection moulded around the wound mandrel 10, terminal pins 30 and holders 14, the terminal pin holders 14 are withdrawn radially into the mandrel 10 and the electrofusion coupler stripped axially from the mandrel.

6 Claims, 3 Drawing Sheets

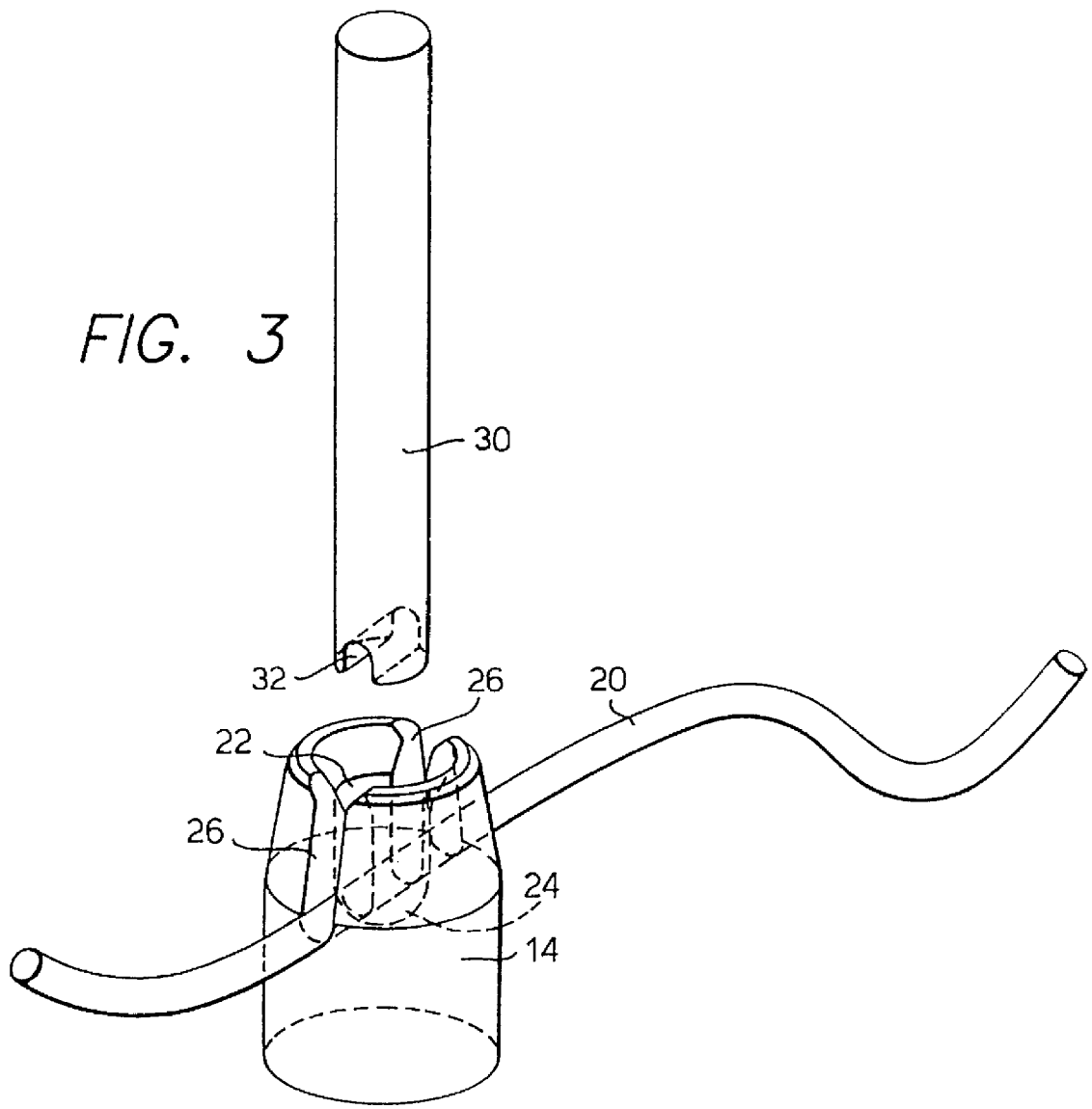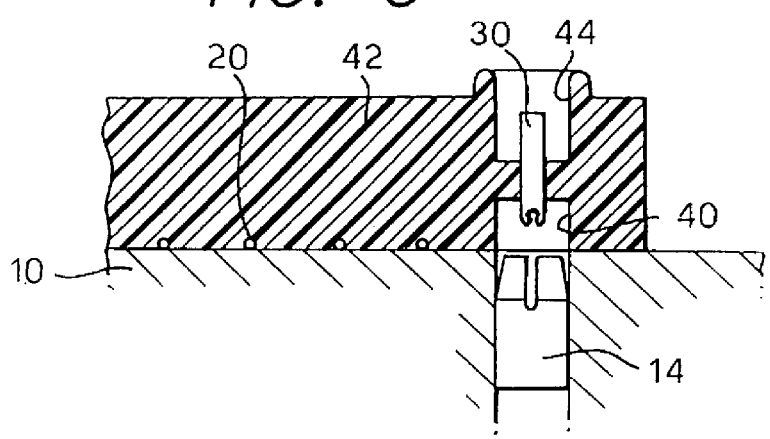

ELECTROFUSION COUPLERS AND METHOD AND APPARATUS FOR MANUFACTURING

THIS INVENTION relates to electrofusion couplers or welding muffs which are used for connecting lengths of plastics pipe end to end in manner known per se. Such an electrofusion coupler is disclosed, for example, in GB2090558.

In manufacture or the electrofusion coupler or GB2090558, a tubular plastics shell or preform is first produced by injection moulding, the preform having upstanding integral studs. An electrical resistance heating wire is then secured to one of these studs on the preform, is wound in a number of turns around the preform from that stud to the other stud and is secured to that stud. The wire is secured to each stud by looping the wire around the stud and over the free end of the stud. A terminal shell or cap is subsequently forced over each stud to make good electrical contact with the wire looped around the stud. The wound preform is then placed in an injection mould, to form the core of the mould, and an outer layer of thermoplastics material is moulded around the wound preform.

The present invention, however, relates to a method of manufacturing an electrofusion coupler which dispenses with the need for making a thermoplastics preform to carry the heating winding and in which the heating wire is wound directly on a mould core or mandrel from which the finished electrofusion coupler is eventually stripped. The invention also relates to apparatus for carrying out the method and to an electrofusion coupler produced by the method of using the apparatus.

According to one aspect or the invention, there is provided a method of forming an electrofusion coupler, comprising providing a mandrel having at spaced apart locations therealong first and second terminal holders which can be retracted into the mandrel inwardly or the peripheral surface thereof, and can be extended outwardly from the peripheral surface thereof, the method including the steps or providing a continuous length of electrical resistance heating wire, mounting a first terminal in the first said terminal holder and securing the first terminal to said wire, winding the wire around the mandrel from said first terminal and said first terminal holder for a plurality of turns, mounting a second terminal in the second terminal holder and securing the second terminal to the wire with the wire being maintained in tension between said first and second terminals, subsequently cutting the wire extending beyond said second terminal, moulding around the wound mandrel and the terminals, supported by said terminal supports, a sleeve or thermoplastics material, leaving portions of the terminal exposed on the exterior of the sleeve, allowing the thermoplastics material to solidify, retracting the terminal supports within the mandrel leaving the terminals supported by the plastics material, and withdrawing the mandrel axially from the sleeve leaving the winding and terminals supported by the plastics sleeve.

According to another aspect of the invention, there is provided apparatus for use in carrying out the above method comprising a mandrel having at spaced-apart locations therealong first and second terminal holders, means for moving said terminal holders between positions in which they are retracted within the mandrel surface and positions in which they project from the mandrel surface, means for winding electrical heating wire around the mandrel from one said terminal support to another, said terminal supports being adapted to hold terminals secured to said heating wire and thereby maintain the wire in tension between the terminal holders, means for cutting the wire at a position adjacent one said terminal holder on the side thereof remote from the other and means for moulding around the mandrel, said terminals and the projecting portions of said terminal supports a sleeve of thermoplastics material.

Figure 2:
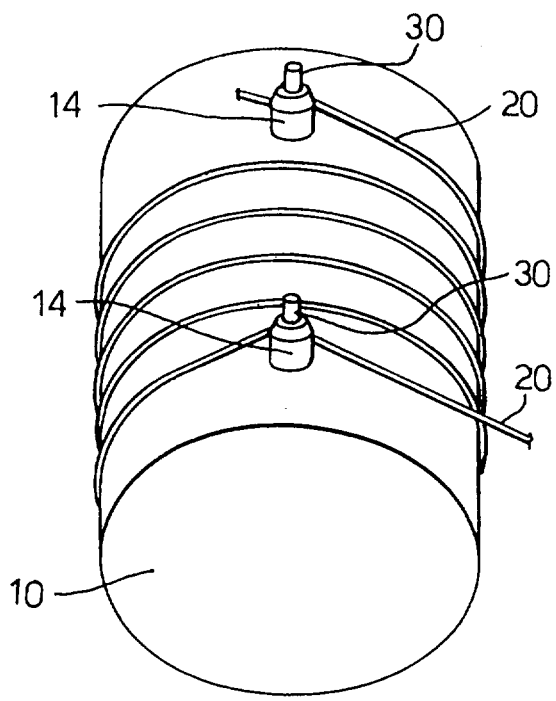
Figure 4:
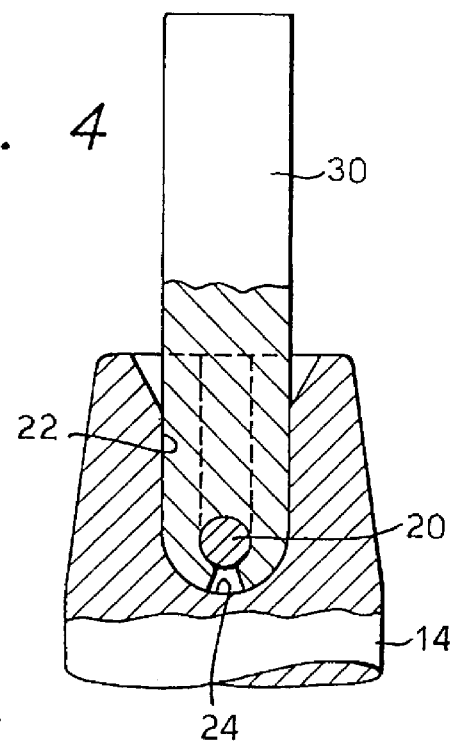
Figure 5:
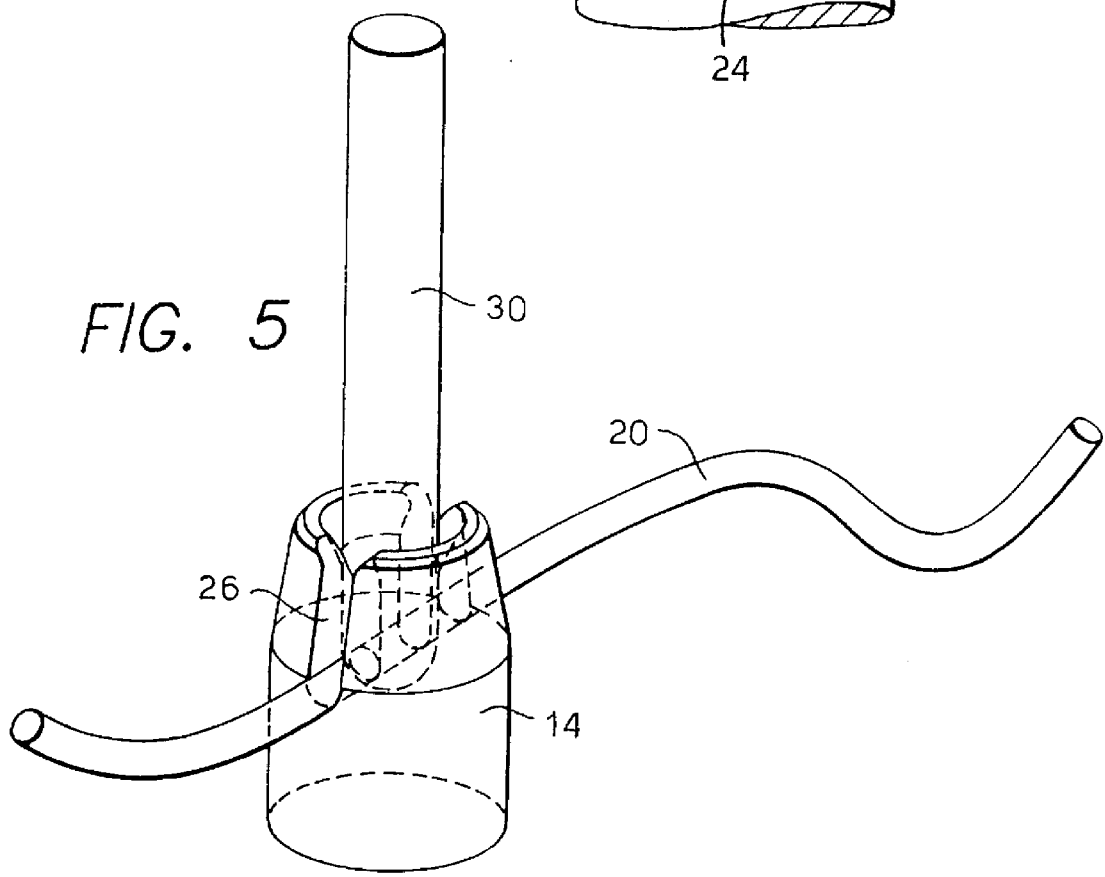

An embodiment of the invention is described below by way of example with reference to the accompanying drawings, in which:

FIG. 1 is a schematic fragmentary view in section along a mandrel or core of an apparatus embodying the invention, FIG. 2 is a schematic perspective view of the mandrel of FIG. 1 with an electrical heating winding thereon, FIG. 3 is a schematic exploded perspective view showing part of a terminal support of the apparatus, in conjunction with a length of resistance heating wire and a terminal pin, FIG. 4 is a view, in section along the axis of the terminal support, showing the position after the terminal pin has been driven into the terminal support and formed around the wire, FIG. 5 is a perspective view, partly in phantom, corresponding to FIG. 4, and FIG. 6 is a fragmentary view of and electrofusion coupler or welding muff formed using the apparatus of FIGS. 1 to 5 still on the mandrel or core, the view being a view in section along the central axis of the welding muff, in a plane containing one of the terminal pins.

Referring to the drawings, there is indicated at 10 a mould core or mandrel for an electrofusion coupler or welding muff. In manufacture of an electrofusion coupler or welding muff by the method of the present invention, the heating wire in wound directly on a mould core or mandrel, which is then placed in an injection mould and the thermoplastics body of the electrofusion coupler is moulded around the mandrel and the winding, after which the mould is opened and the mandrel withdrawn leaving the winding supported by the plastics material on the interior surface of the tubular plastics body of the welding muff or electrofusion coupler.

Referring to the drawings, FIG. 1 shows, at 10, a generally cylindrical mould core or mandrel for an electrofusion coupler or welding muff. The core or mandrel 10 has adjacent opposite ends thereof respective radial bores 12 which receive respective terminal supports 14 each in the form of a generally cylindrical rod or post slidable within its radial bore under the control of actuating means 15, indicated schematically. The actuating means may, for example, be operated by rotation, or longitudinal movement, relative to the core 10, of a central longitudinal rod 16. Details of the actuating means are not given here, but the man skilled in the art will readily be able to propose mechanisms which will produce the desired movement of the terminal supports 14 as described below. By way of example, the rod 16 might take the form of a worm or rack cooperating with pinions secured to screws engaged in screwthreaded bores provided in the lower ends of supports 14 and extending along the axes of supports 14, the supports 14 being non-rotatable in their bores 12 so that rotation of such screws causes retraction or extension of the supports 14.

As shown in FIG. 2, in the first stage in the manufacture of an electrofusion coupler, an electrical resistance heating wire 20 is wound around the mandrel or core 10 from one terminal support 14 to the other in a number of helical turns. As shown in FIG. 3, in which the radially outer end part of a terminal support 14, i.e. the part which is radially outermost with respect to the central longitudinal axis of the mandrel, is shown in perspective, and in FIG. 4, in which the same part is shown in section along the axis of the terminal support, a cylindrical blind bore 22 extends axially into the terminal support and terminates in a hemispherical inner end 24. The bore 22 is intersected by a transverse diametral slot 26 which extends from the free end of the terminal holder 14 along the axis of the terminal holder, but which stops short of the end 24 of bore 22. The slot 26 is of a width to receive the wire 20 as a close fit.

In winding the mandrel with electrical resistance heating wire, the wire is laid in the slot 26 so as to extend across the bore 22 and a terminal pin 30, of the form shown in FIG. 3, is inserted into bore 22 from the open end thereof and is driven against the inner end 24 of the bore 22. As shown in FIG. 4, the entrance to bore 22 is flared to facilitate entry of the pin in 30.

The pin 30, which is of malleable metal such as copper or brass, is generally cylindrical with a diameter corresponding with that of the bore 22, but has at the end thereof which is inserted in the bore 22 a diametral slot 32 of substantially the same width as the slot 26. The pin 30 is inserted into bore 22 with an orientation such that, as it reaches the bottom of bore 22, the heating wire 20 which extends across the terminal support 14 in the slot 26, enters the slot 32. The terminal pin 30 is driven axially forcibly into the support 14 so that the part-spherical end surface 24 of the bore 22 deforms the parts of the end portion of pin 30 on either side of the slot 32 and thus on either side or wire 20, towards one another, whereby the wire 20 is gripped firmly by said parts of the pin 30. The end or slot 32 is preferably rounded as shown in FIG. 3 and the depth of the slot 32 is such that when the step of driving the pin 30 fully into the support 14 has bean completed, the wire is firmly engaged by the material of the pin around most of the periphery of the wire as shown in FIG. 4. FIG. 5 is a perspective view corresponding to FIG. 4. It will be appreciated from the above that the terminal supports 14 act as forming tools or dies with respect to the terminal pins 30.

The orientation of each slot 26 relative to the mandrel 10 is such that the wire extended through the slot 26 lies at such substantially the pitch angle of the intended helical winding of the wire on the mandrel. The mandrel is wound automatically by winding equipment known per se, for example by rotating the mandrel about its axis whilst traversing a winding head from which the wire is supplied axially with respect to the wire, from an appropriate wire source, such as a rotatable mounted reel of such wire (not shown) the apparatus being so arranged that the wire is laid automatically into the slot 26 as winding proceeds. The pin 30 with its slot 32 appropriately oriented is driven into the bore 22 in the respective support 14 shortly after the wire has been laid in the slot 26 in the support 14 and the pin is thereafter held in place in the support by the wire 20. After the wire 20 has been thus secured in a first one of the terminal supports 14, winding of the wire 20 on the mandrel proceeds until the wire is laid in the slot 26 or the other terminal support 14, after which a terminal pin 30 is driven into the second terminal support in just the same way as described in relation to the first and subsequently the wire is cut on the side remote from the first terminal support for example at the location indicated in "X" in FIG. 2. It will be appreciated that the winding equipment typically includes means for gripping the wire at a location upstream or the position at which it is severed after the preceding winding and for retaining such grip on the wire whilst it is extended across the slot 26 of the first terminal support 14 in preparation for securing the pin 32 in that terminal support 14 in readiness for the next winding, and thereafter releasing such grip to allow winding of the wire on the mandrel. The wire is wound on the mandrel under appropriate tension and is held in such tension by the terminal pins 13 and terminal supports. After winding the mandrel with resistance wire, securing the wire by means of the terminal pins 30, and cutting the wire, all as described, the wound mandrel is placed in an injection mould, to form the core of the mould, and molten thermoplastics material is moulded around the core, the wire winding, terminal pins 30 and terminal supports 14.

When the thermoplastics material has solidified, the mould is opened, and the supports 14 are retracted radially inwardly of the mandrel until they lie fully within the cylindrical envelope defined by the mandrel surface. The supports 14 are thus extracted fully from the moulded plastics material. The outer periphery of each terminal support 14 may be tapered or relieved as illustrated to facilitate radially inward extraction of the terminal supports from the plastics of the moulded welding muff. The terminal pins 30, Since they are surrounded, in intermediate regions thereof, by the thermoplastics material, are gripped thereby and therefore remain in their original positions relative to the mandrel surface when the mandrel supports 14 are retracted into the mandrel 10. The fragmentary axial section view of FIG. 6 illustrates this position. It will be noted that a recess 40 is left in the interior of the plastics sleeve by the retraction of the support 14 and that the inner end of the terminal pin 30 extends into the recess (which recess, of course, is traversed by the wire 20 passing through the inner end of pin 30). As already indicated, an intermediate portion of the pin 30 is surrounded by the plastics material 42, whilst a radially outer (relative to the axis or the mandrel 10 and of the welding muff) part of the pin 30 is exposed within a recess 44 moulded in the outside of the welding muff, for engagement with an electrical contact when the welding muff is to be used.

The retraction of the supports 14 below the level of the peripheral surface of the mandrel mares it possible to withdraw the mandrel axially from the finished welding muff. When the molten thermoplastics material is injected into the mould, it surrounds a major part of the circumference of the heating wire in those regions of the wire which lie against the mandrel surface and consequently, after the plastics has solidified and the welding muff has been de-moulded and the mandrel 10 withdrawn, the plastics material holds the heating wire in place at the internal surface of the welding muff. The location of the heating wire directly adjacent the inner surface of the welding muff, and thus directly adjacent the outer surface of any inserted pipe end of complementary size is very favourable to efficient and reliable welding of the muff to inserted pipe ends.

After the mandrel has been withdrawn from the moulded welding muff, the terminal supports 14 are once again extended outwardly from the mandrel 10 into the positions shown in FIG. 1 so that the mandrel 10 is ready to receive a further winding to begin manufacture of afurther welding muff.

It will be appreciated that whilst the mandrel 10 has been referred to as a unitary member, it could be made in two parts meeting in the middle of the welding muff moulded therearound, with a respective terminal holder 14 carried by each of the two parts of the mandrel and with the two parts being finally separated from the moulded welding muff axially in opposite directions.

I claim:

1. A method of forming an electrofusion coupler, comprising providing a mandrel (10) having at spaced apart locations therealong first and second terminal holders (14) which can be retracted into the mandrel (10) inwardly of the peripheral surface thereof, and can be extended outwardly from the peripheral surface thereof, the method including the steps or providing a continuous length of electrical resistance heating wire (20), mounting a first terminal (30) in the first said terminal holder (14) and securing the first terminal (30) to said wire, winding the wire around the mandrel (10) from said first terminal (30) and said first terminal holder (14) for a plurality of turns, mounting a second terminal (30)

in the second terminal holder (14) and securing the second terminal (30) to the wire, with the wire being maintained in tension between said first and second terminals (30), subsequently cutting the wire extending beyond said second terminal (30), moulding around the wound mandrel (10) and the terminals (30), supported by said terminal supports (14), a sleeve (42) of thermoplastics material, leaving portions of the terminals (30) exposed on the exterior of the sleeve (42), allowing the thermoplastics material to solidify, retracting the terminal holders (14) within the mandrel (10) leaving the terminals (30) supported by the plastics material, and withdrawing the mandrel (10) axially from the sleeve (42) leaving the winding and terminals supported by the plastics sleeve, characterised in that each said terminal (30) has an end thereof provided with a slot (32) to receive said wire (20), and each said terminal holder (14) forms an anvil or die member providing, extending into an outer end thereof, a recess (22) to receive said end of such a terminal (30), the terminal holder (14) having a slot (26) disposed to receive said wire (20) extended across the terminal holder (14) and extended through said slot (32) in a said terminal (30) engaged in said recess (22), the terminals (30) being made of malleable metal and wherein the step of mounting each said terminal in the respective terminal holder and securing the terminal to the wire comprises extending the wire (20) across the terminal holder (14) so that it extends through said slot (26) therein, inserting the terminal (30) into said recess (22) in the terminal holder (14) so that said slot (32) in the terminal holder (14) receives the wire (20) extending across the terminal holder (24), and driving the terminal (30) against tho terminal holder (14) to deform the material of the terminal (30) around the wire (20) and thereby grip the wire (20) firmly.

2. The method of claim 1 wherein each said terminal (30) takes the form of a pin having said slot (32), to receive the wire (20), extending longitudinally from a free end thereof and the bottom of said recess (22) in the terminal holder (14) is provided with forming surfaces (24) adapted to engage the portions of said free end of the pin on either side or said slot, below the level of the bottom of the transverse clot (26) in the terminal support (14), and to force said portions or the terminal pin towards one another when the pin (30) is driven longitudinally into the terminal support (14), thereby to cause said portions to deform about the wire (20) extending through said slot (32) in the pin and to grip the wire (20).

3. Apparatus for forming an electrofusion coupler, comprising a mandrel (10) having at spaced-apart locations therealong first and second terminal holders (14), means (15, 16) for moving said terminal holders (14) between positions in which they are retracted within the mandrel surface and positions in which they project from the mandrel surface, means for winding electrical heating wire around the mandrel from one said terminal support to another, said terminal supports (14) being adapted to hold terminals (30) secured to said heating wire (20) and thereby maintain the wire in tension between the terminal holders (14), means for cutting the wire (20) at a position adjacent one said terminal holder (14) on the side thereof remote from the other terminal holder (14) and means for moulding around the mandrel (10), said terminal (30) and the projecting portions of said terminal supports (14), a sleeve of thermoplastic material, wherein said terminal supports (14) are in the form of posts each having a recess (22) extending into the post from its outer end and a transverse slot (26) extending across the post and across the recess (22) in the post from said free end of the post, the slot (26) terminating at a position located outwardly of the inner end (24) of said recess (22), and wherein the inner end (24) of said recess is provided with forming surfaces adapted to deform, towards the plane of said slot (26), respective portions of the end, complementary with said recess (22) and inserted in said recess (22), of a said terminal (30) when the terminal (30) is driven into said terminal holder (14).

4. An electrofusion coupler, comprising:

a unitary sleeve of thermoplastics material having generally radially extending terminal pins embedded therein, each said terminal pin having a radially inner end projecting into a respective recess extending from the inner surface of said sleeve and a radially outer end projecting from the thermoplastic material for engagement by an electrical contact, an intermediate portion of each said terminal pin being embedded in said thermoplastics material;

an electrical resistance wire wound in a plurality of turns about the axis of the sleeve at the inner surface of the sleeve, the resistance wire traversing each said recess extending from the inner surface of the sleeve, each said terminal pin having a transverse slot across its inner end, and wherein the resistance wire which traverses the respective recess extending from the inner surface of the sleeve extends through said slot and is gripped between the portions of the terminal pin on either side of said slot.

5. An electrofusion coupler, comprising:

a sleeve of thermoplastics material having generally radially extending terminals embedded therein, each said terminal having a radially inner end projecting into a respective recess extending from the inner surface of said sleeve and a radially outer end projecting from the thermoplastic material for engagement by an electrical contact, an intermediate portion of each said terminal being embedded in said thermoplastics material;

an electrical resistance wire wound in a plurality of turns about the axis of the sleeve at the inner surface of the sleeve, the resistance wire traversing each said recess extending from the inner surface of the sleeve, each said terminal having a transverse slot across its inner end, and wherein the resistance wire which traverses the respective recess extending from the inner surface of the sleeve extends through said slot and is gripped between the portions of the terminal on either side of said slot.

6. An electrofusion coupler, comprising:

a sleeve of thermoplastics material having generally radially extending terminal pins embedded therein, each said terminal pin having a radially inner end projecting into a respective recess extending from the inner surface of said sleeve and a radially outer end projecting from the thermoplastic material for engagement by an electrical contact, an intermediate portion of each said terminal pin being embedded in said thermoplastics material;

an electrical resistance wire wound in a plurality of turns about the axis of the sleeve at the inner surface of the sleeve, the resistance wire traversing each said recess extending from the inner surface of the sleeve, each said terminal pin having a transverse slot across its inner end, and wherein the resistance wire which traverses the respective recess extending from the inner surface of the sleeve extends through said slot and is gripped between the portions of the terminal pin on either side of said slot.

* * * * *